(12) United States Patent
Bogdanski

(10) Patent No.: US 6,701,995 B1
(45) Date of Patent: Mar. 9, 2004

(54) COMBINATION SHADE HANDLE AND SECURITY LIGHT

(75) Inventor: Richard Bogdanski, Canton, MI (US)

(73) Assignee: Irvin Automotive Products, Inc., Auburn Hills, MI (US)

( * ) Notice: Subject to any disclaimer, the term of this patent is extended or adjusted under 35 U.S.C. 154(b) by 0 days.

(21) Appl. No.: 10/303,628

(22) Filed: Nov. 26, 2002

(51) Int. Cl.⁷ .................................................. E06B 9/00
(52) U.S. Cl. ...................... 160/127; 16/111.1
(58) Field of Search .................. 160/238, 10, 23.1, 160/24, 133, 370.22, 127; 16/111.1, 114.1, 406, 422, 426; 362/154, 156; 296/97.8, 37.16

(56) References Cited

U.S. PATENT DOCUMENTS

| | | | |
|---|---|---|---|
| 4,506,317 A | * | 3/1985 | Duddy ........................ 362/396 |
| 4,542,447 A | | 9/1985 | Quakenbush |
| 4,656,566 A | | 4/1987 | Kelley |
| 4,754,379 A | | 6/1988 | Kelley |
| 4,776,625 A | | 10/1988 | Lobanoff et al. |
| 4,832,242 A | | 5/1989 | Leek |
| 4,855,881 A | | 8/1989 | Pence |
| 5,077,643 A | | 12/1991 | Leach |
| 5,195,817 A | | 3/1993 | Deccio |
| 5,257,169 A | | 10/1993 | Walendziak |
| 5,519,905 A | * | 5/1996 | Bernstein et al. ............... 5/426 |
| 5,577,697 A | * | 11/1996 | Accordino ................ 248/206.5 |
| 5,580,157 A | | 12/1996 | Patricca et al. |
| 5,593,074 A | | 1/1997 | Matthews |
| 5,685,421 A | | 11/1997 | Gilmore |
| 5,685,592 A | | 11/1997 | Heinz |
| 5,887,550 A | * | 3/1999 | Levine et al. ................ 119/796 |
| 5,938,023 A | | 8/1999 | Herron et al. |
| 5,947,358 A | | 9/1999 | Wieczorek |
| 6,030,092 A | | 2/2000 | McCalla et al. |
| 6,039,297 A | | 3/2000 | Johnson |
| 6,176,535 B1 | | 1/2001 | Chaloult et al. |
| 6,206,543 B1 | | 3/2001 | Henry |
| 6,213,186 B1 | | 4/2001 | Torres et al. |
| 6,231,219 B1 | | 5/2001 | Lohss et al. |
| 6,334,693 B1 | * | 1/2002 | Lee ............................ 362/119 |

* cited by examiner

Primary Examiner—David Purol
(74) Attorney, Agent, or Firm—Dinnin & Dunn, P.C.

(57) ABSTRACT

A combination shade handle and light is provided comprising a handle body with a grip portion and a holder portion. The holder portion has a cavity for receiving and storing a security light. A plurality of holder members are provided which secure the security light in the cavity in a snap-fit fashion. The shade handle is attachable to an automobile shade roller assembly for covering an automobile storage compartment. In another aspect, a roller shade is provided having a handle with an integrated removable security light.

17 Claims, 1 Drawing Sheet

COMBINATION SHADE HANDLE AND SECURITY LIGHT

TECHNICAL FIELD

The present invention relates in general to automotive shade roller assemblies, and more particularly to closures for shade rollers in combination with a security light.

BACKGROUND OF THE INVENTION

Shade rollers are well known in the art, and a wide variety of designs have been successful over the years. Typically used in SUV's (Sport Utility Vehicles), a shade roller allows the cargo area to be obscured from view and restrains cargo in the cargo area from projectile motion in accidents or sudden stops. These shades are typically drawn from a roller cassette anchored adjacent the cargo area, either directly behind the rear seat (rear pull) between the trim panels of the rear cargo area, or along one trim panel of the cargo area (side pull). In either instance, the shade typically includes one or more ergonomic grips or handles to facilitate gripping by a human hand to deploy the shade, which is convenient to the person deploying the shade from the rear of the vehicle. To provide a comfortable gripping surface, the handle should preferably have a curved portion generally perpendicular to the shade panel portion to allow human fingers to engage the handle and provide a horizontal force, distributed along the pads of the fingers, rather than a thin or sharp edge which would concentrate the force and "dig" into the fingers.

There are also various known methods of storing flashlights in automobiles, as well as in other locations. Stowing a flashlight inside a vehicle, for example, can make a light source available in situations that must otherwise be navigated in the dark. This is particularly important in automotive vehicles that travel between lighted populated areas through areas which may not be lighted. Automotive engineers, however, are always searching for new ways to conserve space. Further, concerns of safety and convenience continue to drive the search for new ways to store and position supplemental light sources in automobiles.

It is thus desirable to provide a method of securely storing a removable light source at a location near the rear of a vehicle where it can be quickly and easily retrieved. The present invention is directed to solving one or more of the shortfalls or problems associated with related inventions.

SUMMARY OF THE INVENTION

In one aspect, a handle for an automobile shade roller assembly is provided. The handle includes a substantially D-shaped handle body having a holder for securing a removable light. The holder is positioned within a cavity defined by the handle body, and includes a plurality of holder members snap-fittingly engageable with the light.

In another aspect, a handle for a vehicle shade roller assembly is provided. The handle includes a substantially D-shaped handle body having an integrated security light holder for receiving and storing a security light in a removable fashion.

In still another aspect, a vehicle security roller shade is provided. The roller shade includes an extensible and retractable flexible shade body secured at one end to a roller assembly, and having an opposite end secured to a handle. The handle defines an interior storage cavity, and includes a holder for removably retaining a light member in the handle body.

DETAILED DESCRIPTION OF PREFERRED EMBODIMENTS

Figure 1:
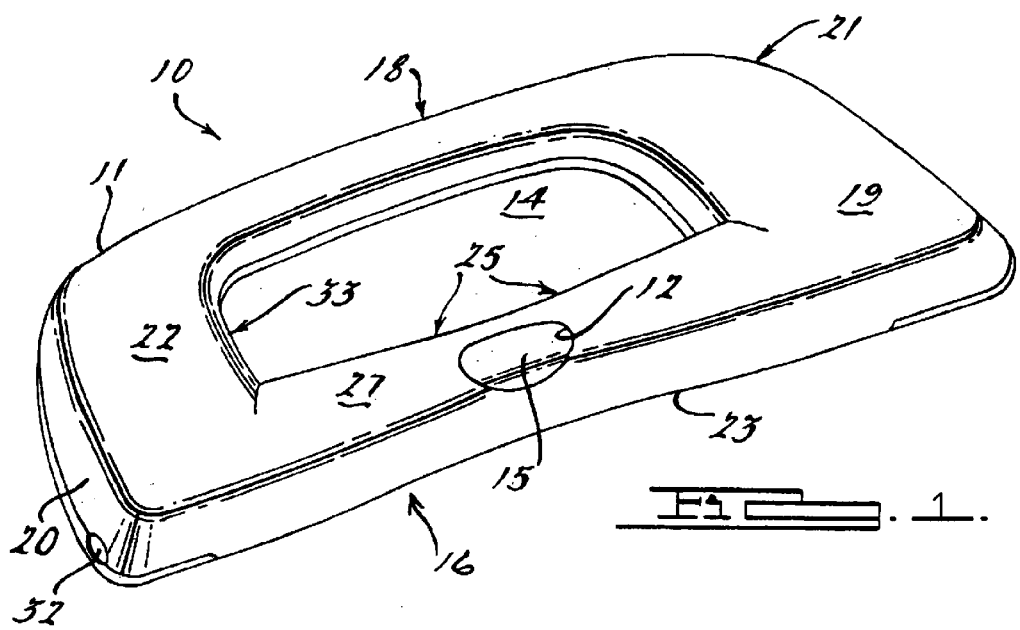
FIG. 1 is a top view of a shade handle according to the preferred embodiment of the present invention.
Figure 2:
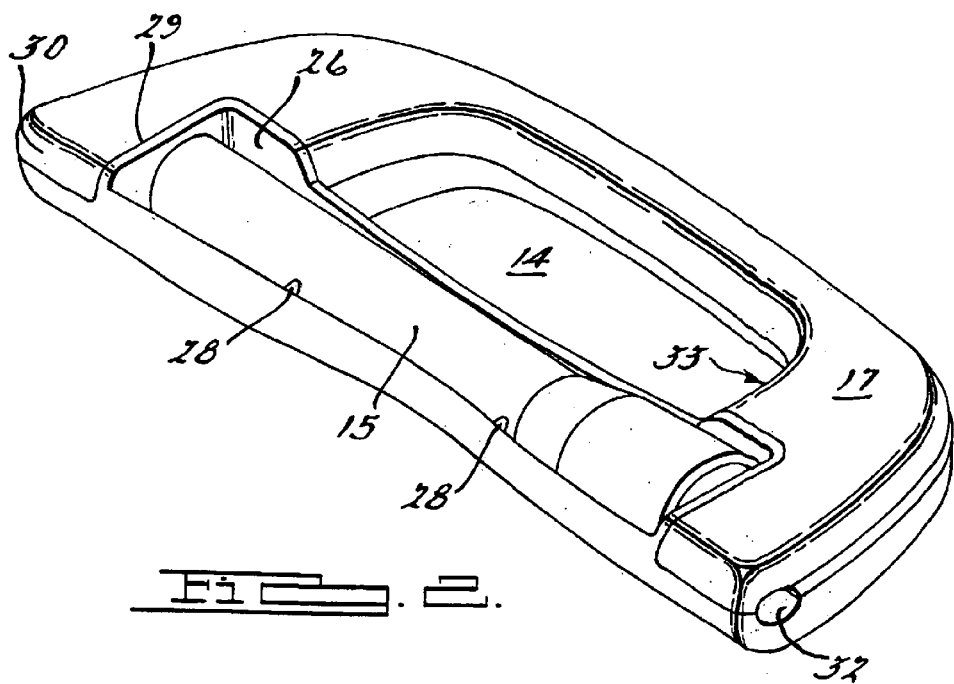
FIG. 2 is a bottom view of the shade handle of FIG. 1, illustrating an included flashlight in a stowed position.

Referring to FIGS. 1 and 2, there are shown top and bottom views, respectively, of a shade handle 10 according to a preferred constructed embodiment of the present invention. Shade handle 10 comprises a D-shaped handle body 11 with an arcuate-shaped grip portion 21 connected to a holder portion 23. Grip portion 21 preferably has a partially flattened bottom side 17, and a top/upper side 19 which is also preferably partially flattened. Holder portion 23 is preferably substantially straight with a narrowed region 25. Holder portion 23 has a top side 27, which is preferably rounded, and defines a cavity 26 in a bottom side 29, within which a security light holder is positioned (described below). Grip portion 21 and holder portion 23 each share a continuous inner edge 33, which defines a central channel 14. Channel 14 is located in the interior of handle body 11 and has a perimeter represented by inside edge 33 of handle body 11. Preferably, this perimeter 33 is substantially parallel to an outside edge 35 of handle body 11. Handle 10 may be manipulated by inserting one's hand through channel 14, and gripping grip portion 21.

Handle body 11 is preferably formed from a top piece 20 and a bottom piece 30, and has a front side 18 and a rear side 16. In a preferred embodiment, grip portion 21 is constructed in part by top piece 20 and in part by bottom piece 30, while holder portion 23 is also constructed in part by top piece 20 and in part by bottom piece 30. Top piece 20 preferably includes top side 27 of holder portion 23, and a top side 22 of grip portion 21. Bottom piece 30 preferably includes bottom side 17 of grip portion 21. Bottom piece 30 may be textured or coated with a suitable rubber, or other high-friction material, to facilitate manual manipulation. It should be appreciated that the use of separate pieces merely represents one embodiment, and a handle of unitary construction might be made without departing from the scope of the present invention. Top piece 20 and bottom piece 30 preferably each define in part a set of two mounting apertures 32 positioned along the rear side 16 of handle body 11, one of which is illustrated in FIG. 2. In the preferred embodiment, handle body 11 is pivotably attached to an automobile shade (not shown) at its rear side 16 via mounting apertures 32 by a known method, for example, inserting mounting members (not shown) into mounting apertures 32. Handle 10 may then be pivoted about the attached mounting members, which are secured to the shade. A person can thus grasp grip portion 21 and pull the attached shade to cover an automobile storage compartment or, alternatively, control the retracting motion of the attached shade while uncovering the automobile storage compartment.

Referring now in particular to FIG. 2, cavity 26 is preferably located within top piece 20. A security light member 15, illustrated as a conventional flashlight, is held by the security light holder within cavity 26, which is preferably a trough with a slightly larger diameter than the associated security light 15. The interior of cavity 26 conforms roughly in shape to the exterior surface of the light 15. In this embodiment, the cross section of cavity 26 is generally U-shaped, however, this feature is dictated in part by the shape of the included light member, which might vary considerably, necessitating a different shaped cavity. The security light holder preferably comprises a plurality of holder members 28 positioned within cavity 26, protruding into its interior. Each holder member 28 is preferably positioned in cavity 26 opposite another holder member 28 and separated by a distance that is slightly smaller than the diameter of security light 15. Because top piece 20 is preferably constructed of a relatively flexible plastic, security light 15 can be snap-fit into cavity 26 in a manner known in the art. The preferred embodiment employs four holder members 28, however, it should be appreciated that a different number of holder members, or even a different method altogether of securing security light 15 might be employed without departing from the scope of the present invention. Furthermore, the conventional flashlight illustrated need not be used; a light with a different shape might be utilized, along with a corresponding cavity shape. For example, it is contemplated that the light can be rectangular in cross section with its narrow dimension extending into the holder so as to reduce the span between the handle edge and the finger opening.

Returning to FIG. 1, holder portion 23 has a roughly oval aperture 12, through which a portion of security light 15 is exposed. When detachment of security light 15 is desired, manual pressure may be applied to security light 15 via aperture 12 to push security light 15 free of cavity 26, overcoming the force of holder members 28. Because top piece 20 is constructed of a relatively flexible plastic material, as are holder members 28, the downward force on security light 15 causes holder members 28 to flex outward, freeing security light 15. In manufacturing handle 10, it should be appreciated that the level of force necessary to disengage security light 15 from cavity 26 should be carefully calculated. Because cavity 26 faces a down direction in the preferred embodiment, the weight of security light 15 is continuously bearing down against holder members 28, imparting a tendency for security light 15 to dislodge. Furthermore, inertial forces resulting from bumps and movements of handle 10 create a risk that security light 15 will fall from cavity 26 at an undesirable time if it is held too loosely. Conversely, if security light 15 is held too securely, it may not be quickly and easily available in an emergency, or provide too much resistance for young or elderly people or others with low hand strength. Thus, the relative flexibility of the plastic material from which top piece 10 is constructed, and the relative distance between oppositely positioned holder members 28 should be carefully selected to ensure sufficient holder strength, while still allowing quick and easy removal of security light 15 when desired.

An alternative embodiment might position the security light on the top of handle 10, which would securely hold the light in place and require less clamping force from the holders. However, such an arrangement would tend to expose the light to view, making it aesthetically undesirable. Thus, in this alternate embodiment, it is preferred to have a cover over the cavity 26, which can pivot or slide to expose the light for removal.

It should be understood that the present description is for illustrative purposes only, and should not be construed to limit the scope of the present invention in any way.

Those skilled in the art will appreciate that various modifications could be made to the disclosed embodiments without departing from the spirit and scope of the present invention. For instance, security light 15 might be affixed to handle 10 with Velcro™ or a similar material, or even with magnetic means. In addition, a different method of disengaging security light 15 might be used, such as a button with a return spring. Other aspects and features of the present invention will be evident upon examination of the attached drawing figures and appended claims.

What is claimed is:

1. A handle for an automobile shade roller assembly, comprising:
   a substantially D-shaped handle body having a holder for securing a removable light; wherein
   said handle body comprises a grip portion and an attachment portion;
   said holder is positioned within a cavity defined by said handle body and located in said grip portion, said cavity extending longitudinally in said grip portion and open along a longitudinal edge thereof for receipt of the light, and
   said holder includes a plurality of holder members snap-fittingly engageable with said light.

2. The handle of claim 1 wherein said cavity has a substantially U-shaped cross section and an open side, said open side being defined by a bottom side of said handle body; and wherein
   said holder members are positioned in opposing pairs, and protrude into an interior of said cavity, said light being engageable with said holder members via said open side of said cavity.

3. The handle of claim 1 wherein said handle body defines an aperture in a top side, said aperture connecting with said cavity.

4. A handle for a vehicle shade roller assembly, comprising:
   a substantially D-shaped handle body having an integrated security light holder for receiving and storing a security light in a removable fashion;
   said handle body comprising an elongate cavity for receipt of the light, with flexible holder means therein adapted to receive the light in a snap-fit fashion.

5. The handle of claim 4 wherein said handle body comprises a substantially straight holder portion and an arcuate grip portion; and
   said security light holder is positioned within a cavity defined by said holder portion, said security light holder comprising a plurality of holder members extending toward an interior of said cavity.

6. The handle of claim 4 wherein said security light holder includes a trough defined by said handle body, said trough having a U-shaped cross section and opening to a bottom side of said handle body, said security light holder further including a plurality of holder members positioned in said trough to receive said security light in a snap-fit fashion.

7. The handle of claim 4 wherein said security light holder comprises a Velcro™ or similar material interface with said security light.

8. The handle of claim 4 wherein said security light holder comprises a magnetic material for magnetically retaining said security light.

9. The handle of claim 4 wherein said handle body defines a hole in an upper surface of said holder portion.

10. A vehicle security roller shade comprising:
    an extensible and retractable flexible shade body secured at one end to a roller assembly, and having an opposite end secured to a handle, said handle defining an interior storage cavity; and
    a holder located in said storage cavity for removably retaining a light member in said handle body.

11. The vehicle security shade of claim 10 wherein said handle body includes an upper surface and a lower surface, said lower surface defining an access opening to said cavity, and said upper surface defining a second access opening to said cavity.

12. The vehicle security shade of claim 10 wherein said cavity has a substantially U-shaped cross section;
   said holder comprises a plurality of holder members protruding into an interior of said cavity; and
   said holder members are positioned in opposition in said cavity to receive said light member in a snap-fit fashion.

13. The vehicle security shade of claim 10 wherein said handle is D-shaped.

14. The vehicle security shade of claim 10 wherein said handle is square.

15. The vehicle security shade of claim 10 wherein said handle body further comprises a top piece and a bottom piece;
   wherein said storage cavity is located in said top piece; and
   said top piece and said bottom piece each at least partially define a set of mounting apertures for pivotally securing said handle body to said retractable shade.

16. The handle of claim 10 wherein said handle comprises a Velcro™ or similar material adapted to interface with the light.

17. The handle of claim 10 wherein said handle comprises a magnetic material for magnetically retaining the light.

* * * * *